9704X
W. H. Atkins,
Domestic Oven.
Patented June 2. 1836.
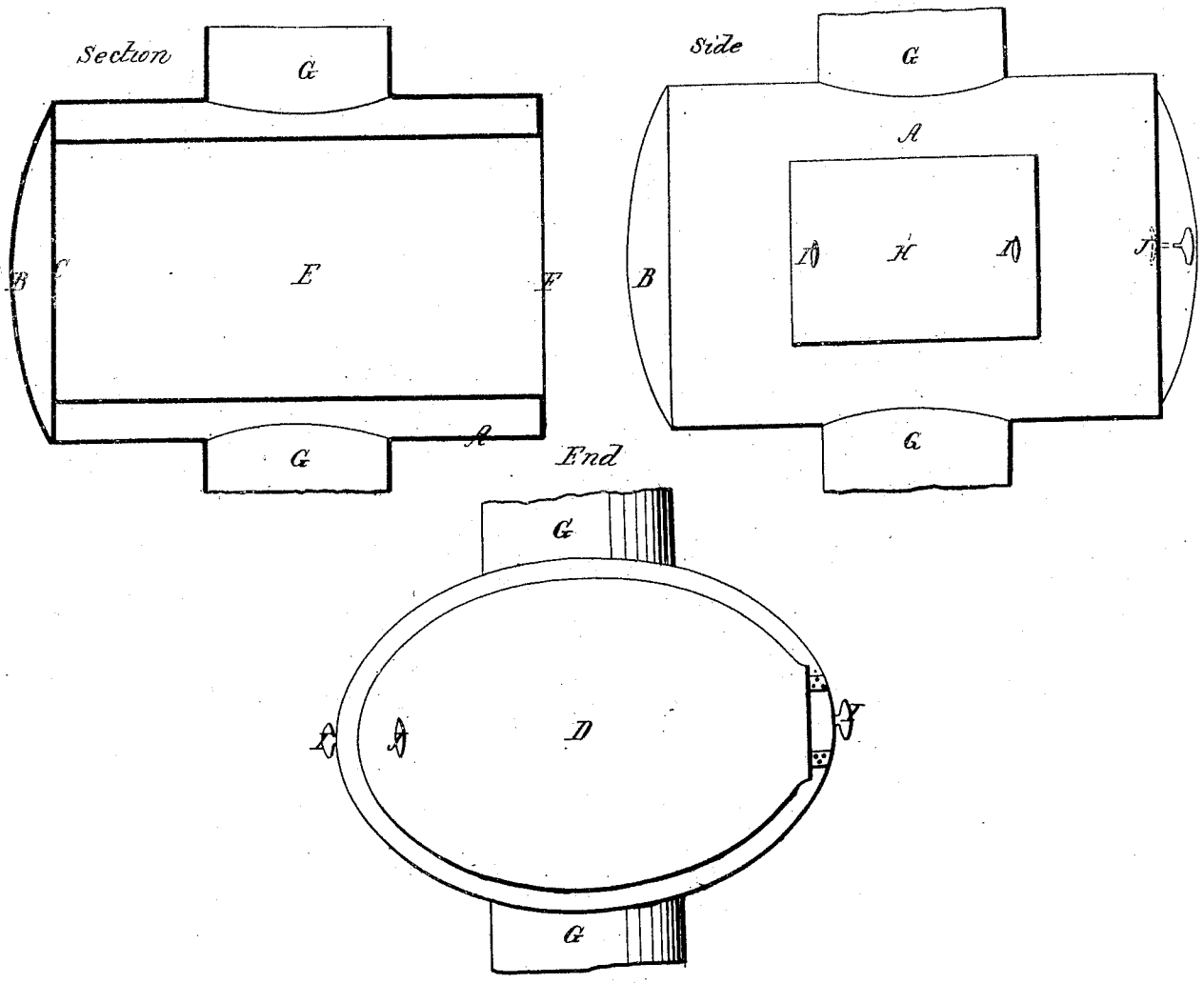
THE NORRIS PETERS CO., WASHINGTON, D. C.

MISSING PAGE TEMPORARY NOTICE

PATENT # 9704X FOR ISSUE DATE 6/2/1836

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text